(12) United States Patent
McLaughlin et al.

(10) Patent No.: US 7,798,503 B2
(45) Date of Patent: Sep. 21, 2010

(54) CAST APEX ADJUSTABLE V-TYPE TORQUE ROD

(75) Inventors: Ronald McLaughlin, Maumee, OH (US); Frank McCarthy, Milan, OH (US); Matthew Wieczorek, Norwalk, OH (US); Brent Johnston, Milan, OH (US)

(73) Assignee: The Pullman Company, Milan, OH (US)

( * ) Notice: Subject to any disclaimer, the term of this patent is extended or adjusted under 35 U.S.C. 154(b) by 763 days.

(21) Appl. No.: 11/332,868

(22) Filed: Jan. 16, 2006

(65) Prior Publication Data

US 2007/0164493 A1    Jul. 19, 2007

(51) Int. Cl.
*B62D 7/16* (2006.01)
(52) U.S. Cl. ............ 280/93.51; 180/352; 267/66
(58) Field of Classification Search .......... 280/124.156, 280/93.51, 124.167, 86.757, 124.106, 124.111, 280/124.116; 267/278, 66; 180/352; 403/150, 403/46, 234
See application file for complete search history.

(56) References Cited

U.S. PATENT DOCUMENTS

| 731,753 | A | * | 6/1903 | Charron | .................... 188/18 R |
| 1,322,063 | A | * | 11/1919 | Seery | ............................ 267/66 |
| 1,383,521 | A | * | 7/1921 | Brocksmith | .................. 267/66 |
| 1,488,535 | A | * | 4/1924 | Forde | ............................ 267/66 |
| 1,573,782 | A | * | 2/1926 | Portis | ............................ 267/66 |
| 1,643,970 | A | * | 10/1927 | Wilkins | ........................ 267/66 |
| 2,099,817 | A | * | 11/1937 | Mahana | ....................... 105/102 |
| 2,115,915 | A | * | 5/1938 | McCain | .................. 280/86.757 |
| 2,300,844 | A |   | 11/1942 | Olley | |
| 2,319,430 | A | * | 5/1943 | Olley et al. | .................... 267/66 |
| 2,951,709 | A | * | 9/1960 | Ward | .......................... 280/680 |
| 3,497,233 | A | * | 2/1970 | Bolaski, Jr. | ............. 280/86.757 |
| 3,786,695 | A | * | 1/1974 | Barrett, Jr. | .................... 74/586 |
| 3,938,822 | A | * | 2/1976 | Guerriero | .............. 280/86.758 |
| 4,415,179 | A |   | 11/1983 | Marinelli | |
| 5,230,528 | A | * | 7/1993 | Van Raden et al. | ......... 280/86.5 |
| 5,267,751 | A |   | 12/1993 | Hiromoto et al. | |
| 5,366,035 | A |   | 11/1994 | Hayashida et al. | |
| 5,458,359 | A |   | 10/1995 | Brandt | |
| 5,524,921 | A |   | 6/1996 | Ellingsen | |
| 5,549,320 | A |   | 8/1996 | Ellingsen | |
| 5,564,521 | A |   | 10/1996 | McLaughlin et al. | |
| 5,649,719 | A |   | 7/1997 | Wallace et al. | |
| 5,662,348 | A |   | 9/1997 | Kusama et al. | |
| 5,711,544 | A |   | 1/1998 | Buhl | |
| 5,746,441 | A | * | 5/1998 | VanDenberg | ......... 280/124.116 |
| 5,782,078 | A | * | 7/1998 | Brantley | ....................... 60/797 |
| 5,820,151 | A | * | 10/1998 | Cheng et al. | ................. 280/233 |
| 6,231,264 | B1 | * | 5/2001 | McLaughlin et al. | .......... 403/76 |
| 6,267,526 | B1 | * | 7/2001 | McLaughlin | ................. 403/150 |
| 6,886,840 | B2 | * | 5/2005 | Reineck | ............... 280/124.107 |

(Continued)

*Primary Examiner*—Paul N Dickson
*Assistant Examiner*—Timothy D Wilhelm
(74) *Attorney, Agent, or Firm*—Harness, Dickey & Pierce, PLC

(57) ABSTRACT

A V-configuration torque rod includes an apex joint assembly which includes a cast apex joint housing. A pair of solid rods are threadingly received by the cast apex joint housing and an end joint assembly is attached to the end of each solid rod. A retention system in the form of a clamp or jamb nut secure the solid rods to the cast apex joint housing. A length adjustment mechanism can be incorporated between the solid rods and the end joint assemblies if necessary.

17 Claims, 6 Drawing Sheets

U.S. PATENT DOCUMENTS

| | | | |
|---|---|---|---|
| 6,966,567 B2* | 11/2005 | McLaughlin | 280/93.51 |
| 7,163,216 B2* | 1/2007 | McLaughlin | 280/93.51 |
| 2003/0160416 A1* | 8/2003 | Leen | 280/124.116 |
| 2004/0222610 A1* | 11/2004 | McLaughlin | 280/124.1 |
| 2005/0218621 A1* | 10/2005 | Ziech et al. | 280/124.116 |
| 2006/0151968 A1* | 7/2006 | Kim | 280/86.757 |

\* cited by examiner

CAST APEX ADJUSTABLE V-TYPE TORQUE ROD

FIELD OF THE INVENTION

The present invention is related to torque rod assemblies for use in suspension systems for trucks, buses and the like. More particularly, the present invention is related to an improved cast apex adjustable V-type torque rod assemblies.

BACKGROUND OF THE INVENTION

Truck and bus suspensions utilize at least one torque rod to secure the drive axle to the vehicle's frame. The securing of the drive axle to the vehicle's frame by the torque rod maintains the drive axle's alignment to the vehicle's frame, it maintains the proper suspension geometry for the vehicle, and it allows free suspension movements in jounce and rebound for all terrain, road and driving conditions. Because of the wide range of dynamic operating conditions for these vehicles, especially heavy duty trucks, the severe impact loads to the suspension system combined with the road induced vibrations on the suspension system lead to a deleterious effect on the individual suspension components including the torque rods as well as having a negative impact on the operator's physical fatigue condition. These severe dynamic conditions can accelerate wear of the torque rods of the suspension system leading to premature failures of these torque rods.

The purpose of torque rods on large vehicles is to stabilize the axle. They prevent the axle from rotating about its axis; they prevent the axle for moving fore and aft during braking and acceleration; and they prevent axle yaw. While there are a variety of suspension designs, one of two approaches are generally used to stabilize the axle. The first approach uses straight rods with pivotal joints at either end. Two of these straight rods are mounted fore and aft on the vehicle; where one end is mounted to the axle and the other end is mounted to the frame. A third straight rod is similarly mounted laterally in the vehicle, generally perpendicular to the other two. The second approach is a V-configuration torque rod assembly. This type of torque rod has pivotal joints at the apex of the V as well as at the ends of the legs. The apex is mounted to the axle, and the legs are mounted to the frame. The V-configuration controls both fore-aft movement as well as lateral movement. The major advantage of the V-configuration rod assembly is axle stability.

A typical prior art single or V-configuration torque rod is comprised of two or three pivotal joint eyelet forgings rigidly connected with tubes to provide the mechanical integrity. The eyelets and tubes form a natural path for shock and vibration energy to transfer from the suspension system into the frame, the cab and other areas of the sprung mass of the vehicle. In order to intercept this path, attempts have been made to incorporate an isolation function into the pivotal joint design. This isolation function thus makes the pivotal joint a critical multi-functional component for the torque rod assembly as well as the suspension system as a whole.

These prior art torque rods have been designed as MIG welded tube to tube designs, resistance and MIG welded tube to tube designs, polymer designs as well as other types of construction. Designs which incorporate solid bars, which are cheaper, were not able to be developed due to the fact that the diameter of the solid rod was too small to be connected to the pivot joints and still maintain an acceptable eye flexure and fatigue life. The tube designs, being larger in diameter, offered a larger radius at the point of welding to the pivot joints thus significantly improving the flexure and fatigue strength of the assembly.

The continued development of torque rod assemblies has been directed towards lower cost designs for the apex joint which allow for the use of solid bars to lower their cost and which offer equivalent or better performance characteristics.

SUMMARY OF THE INVENTION

The present invention provides the art with a cast apex joint for a V-type torque rod assembly which is designed to mate with solid bar torque rods that provide an improved performance along with a high load carrying capability while lowering the costs associated with the torque rod assembly. The torque rod assembly of the present invention is more economical due to the use of the lower cost solid bar connecting sections.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
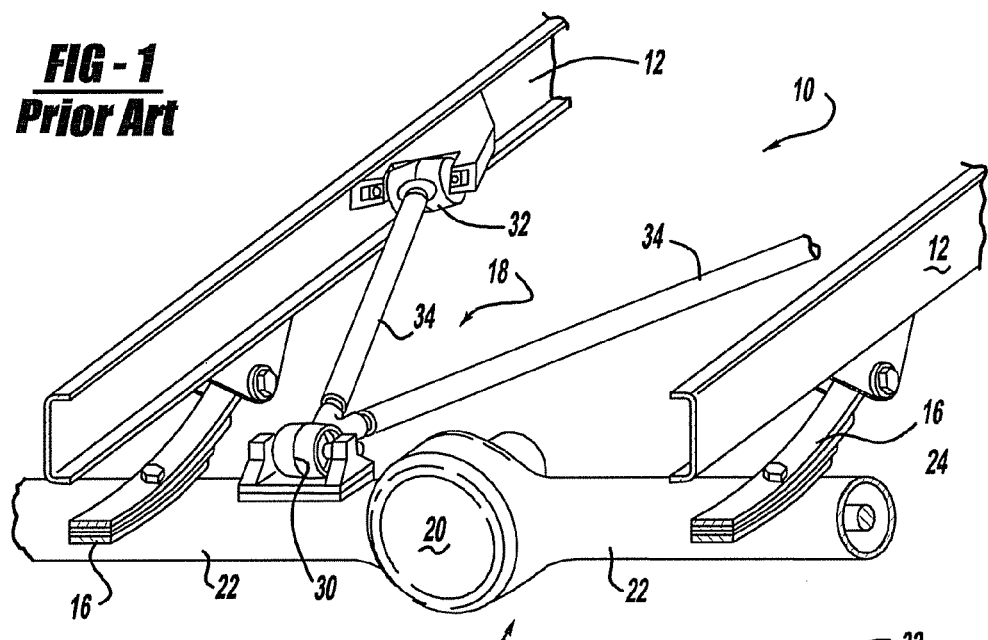
FIG. 1 is a partial perspective view of a prior art truck or bus rear suspension having a prior art V-configuration torque rod.

Referring now to the drawings in which like reference numerals designate like or corresponding parts throughout the several views, there is shown in FIG. 1 a prior art truck or bus rear suspension indicated generally by the reference numeral 10. Rear suspension 10 comprises a frame 12, a drive axle 14, a pair of springs 16 and a V-configuration torque rod 18. Frame 12 supports a body (not shown) and other components of the vehicle which are termed the sprung mass. Drive axle 14 includes a differential 20 which receives torque from an engine (not shown) through a prop shaft (not shown). Drive axle 14 also includes a pair of hollow tubes 22 that each extend out to a respective wheel assembly (not shown). Disposed within each tube 22 is a drive shaft 24 that extends to a hub (not shown) to which is attached a wheel (not shown). The engine transmits torque to differential 20 though the prop shaft. Differential 20 transfers the torque from the prop shaft to drive shafts 24 to rotate and thus drive the wheels. Springs 16 are disposed between frame 12 and drive axle 14 as is well known in the art. Additionally, a shock absorber (not shown) can be disposed between frame 12 and drive axle 14 to damper the motion between these two components. Torque rod 18 is also disposed between frame 12 and drive axle 14 to control the motion of drive axle 14 with respect to frame 12.

Figure 2:
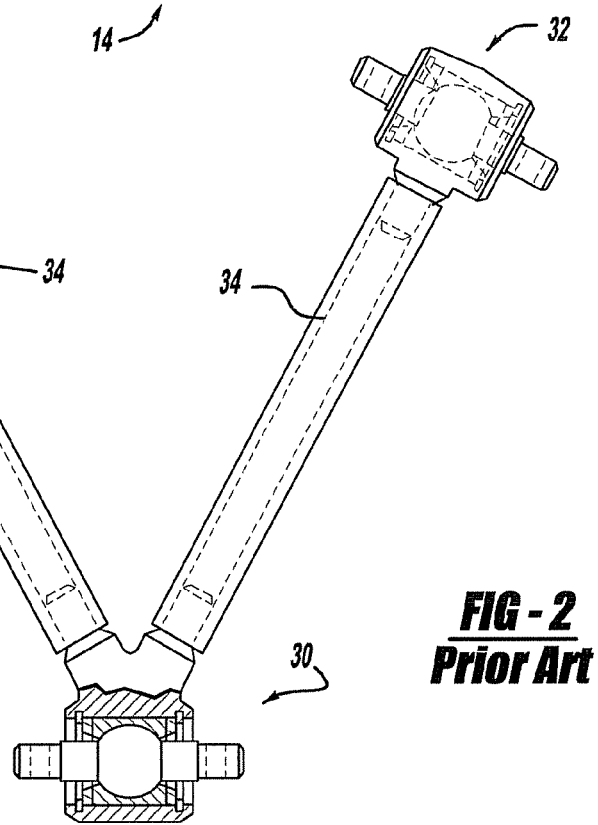
FIG. 2 is a plan view, partially in cross-section, illustrating the prior art V-configuration torque rod shown in FIG. 1.

Referring now to FIG. 2, V-configuration torque rod 18 comprises an apex pivotal joint assembly 30, a pair of end pivotal joint assemblies 32 and a pair of tubes 34. Each tube 34 extends between apex pivotal joint assembly 30 and a respective end pivotal joint assembly 32. Apex pivotal joint assembly 30 and end pivotal joint assemblies 32 are secured to tubes 34 by welding or by other means known well in the art.

Figure 3:
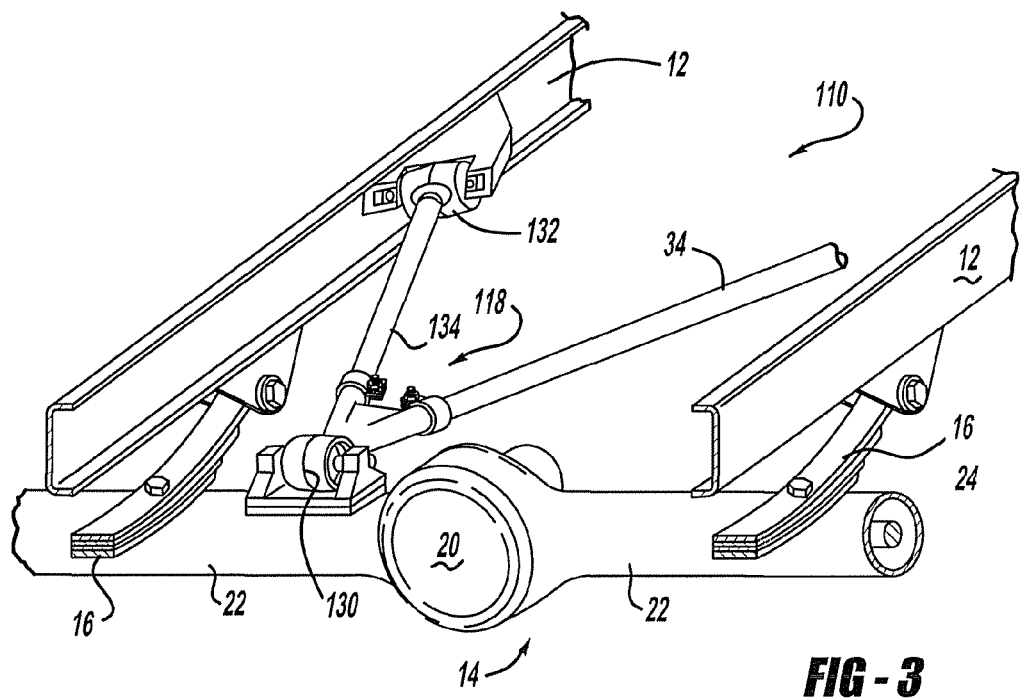
FIG. 3 is a partial perspective view of a typical truck or bus rear suspension having a V-configuration torque rod incorporating the solid bar connecting rod in accordance with the present invention.

Referring now to FIG. 3, a truck or bus rear suspension is illustrated incorporating the torque rod assembly in accordance with the present invention and it is designated generally by the reference numeral 110. Rear suspension 110 comprises frame 12, drive axle 14, the pair of springs 16 and a V-configuration torque rod 118. Rear suspension 110 is thus the same as rear suspension 10 but it replaces torque rod 18 with torque rod 118.

Figure 4:
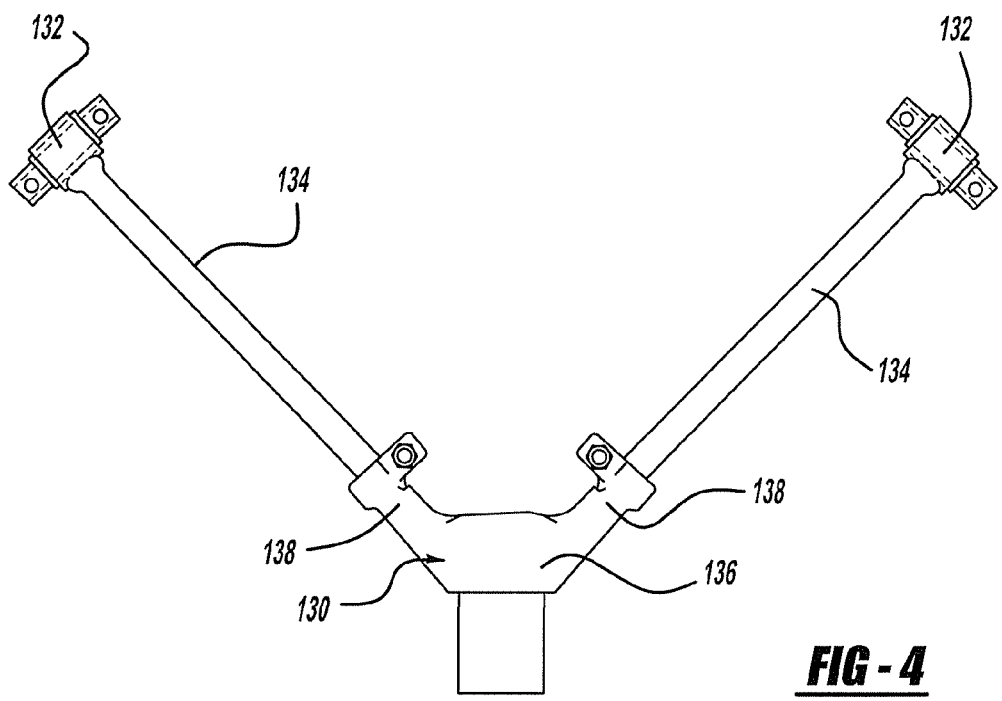
FIG. 4 is a plan view, partially in cross-section illustrating a unique V-configuration torque rod in accordance with the present invention.

Referring now to FIG. 4, V-configuration torque rod 118 comprises a cast apex pivotal joint assembly 130, a pair of end pivotal joint assemblies 132 and a pair of solid bars 134. Each solid bar 134 extends between cast apex pivotal joint assembly 130 and a respective end pivotal joint assembly 132. End pivotal joint assemblies 132 are secured to solid bars 134 by welding or by other means known in the art. Cast apex pivotal joint assembly 130 is secured to solid bars 134 using a threaded connection as detailed below.

As shown in FIG. 4, cast apex pivotal joint assembly 130 is assembled into a V-shaped housing 136 which includes a pair of angular tubular rod extensions 138 which are angled at an angle which is specific to each vehicle application.

Figure 6:
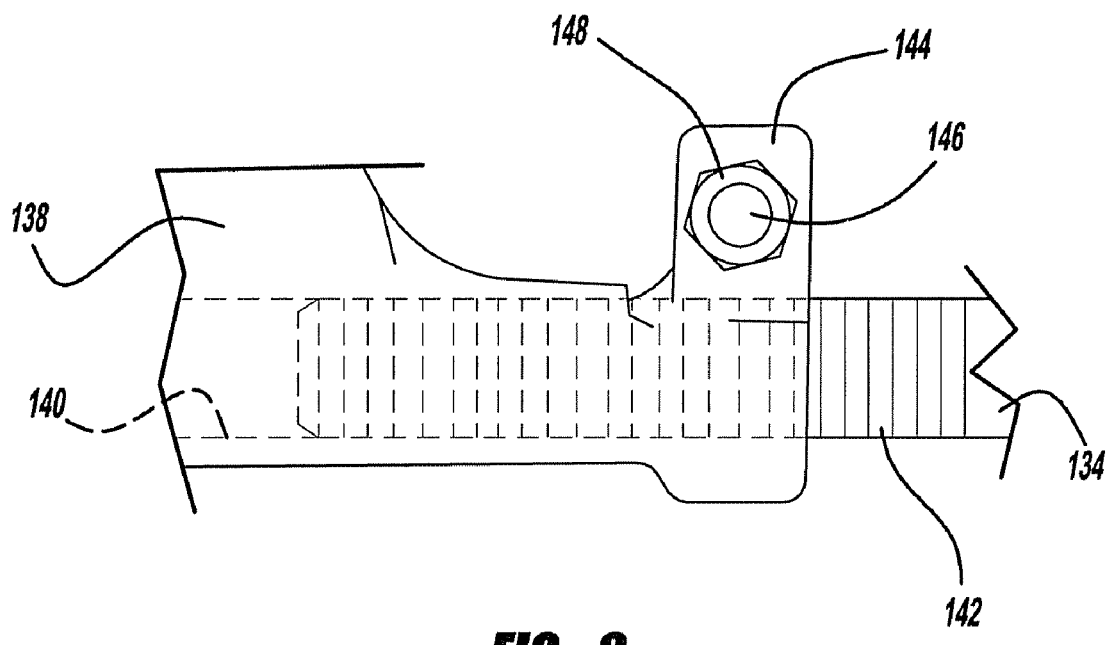
FIG. 6 is an enlarged view of the connections between the solid bar and the apex pivotal joint of the torque rod shown in FIG. 4.

Referring now to FIGS. 4 and 6, each tubular rod extension 138 defines a threaded bore 140 which is designed to threadingly accept a threaded end 142 of solid bar 134. A clamp 144 is integral with tubular rod extension 138 and it is designed to clamp a portion of solid bar 134 using a bolt 146 and a nut 148 once the proper length between cast apex pivotal joint assembly 130 and end pivotal joint assembly 132 is set. While clamp 144 is illustrated as being integral with tubular rod extension 138, it is within the scope of the present invention to have clamp 144 as a separate component which is then assembled to tubular rod extension 138.

Figure 5:
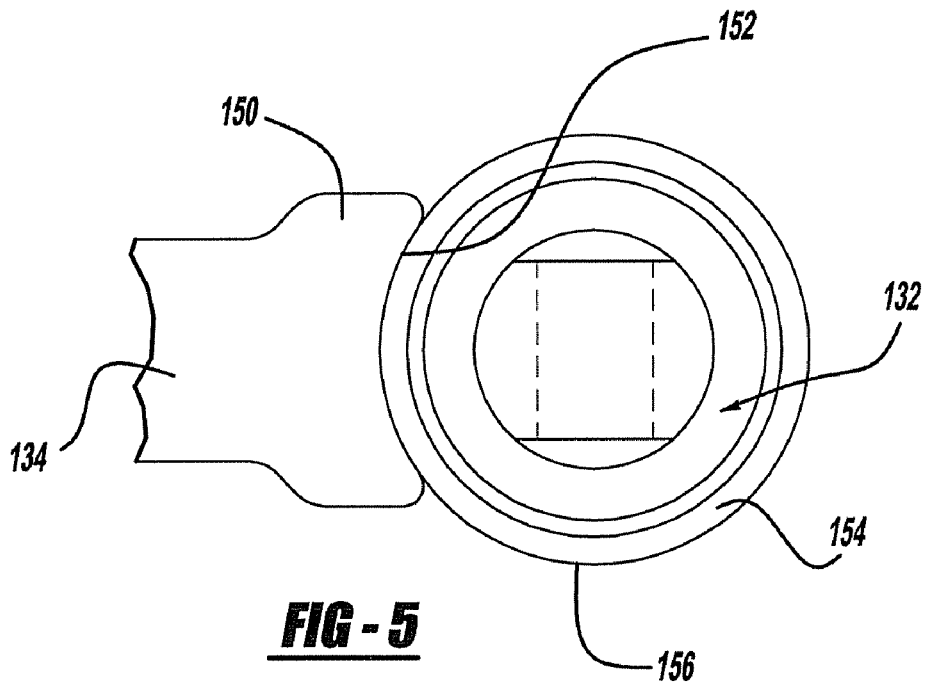
FIG. 5 is an enlarged side view of the connection between the spacer bar and the end pivotal joint shown in FIG. 4.

Referring now to FIG. 5, an enlarged view of the connection between solid bar 134 and its respective end pivotal joint assembly 132 is illustrated. Solid bar 134 defines an enlarged section 150 defining a generally cylindrical surface 152. Preferably, enlarged section 150 is manufactured by heading the end of solid bar 134 as is well known in the art. A generally tubular eyelet 154 defines an outer surface 156 which mates with cylindrical surface 152. Eyelet 154 is secured to enlarged section 150 by MIG welding or by other methods known well in the art. The heading operation that is performed on solid bar 134 increases the radial dimension of the welding area thus allowing the welding to be performed at a radial dimension that has proven to avoid early fatigue failures of the connection. Once eyelet 154 has been secured to solid bar 134, the assembly of end pivotal joint assembly 132 into eyelet 154 can be accomplished.

Figure 7:
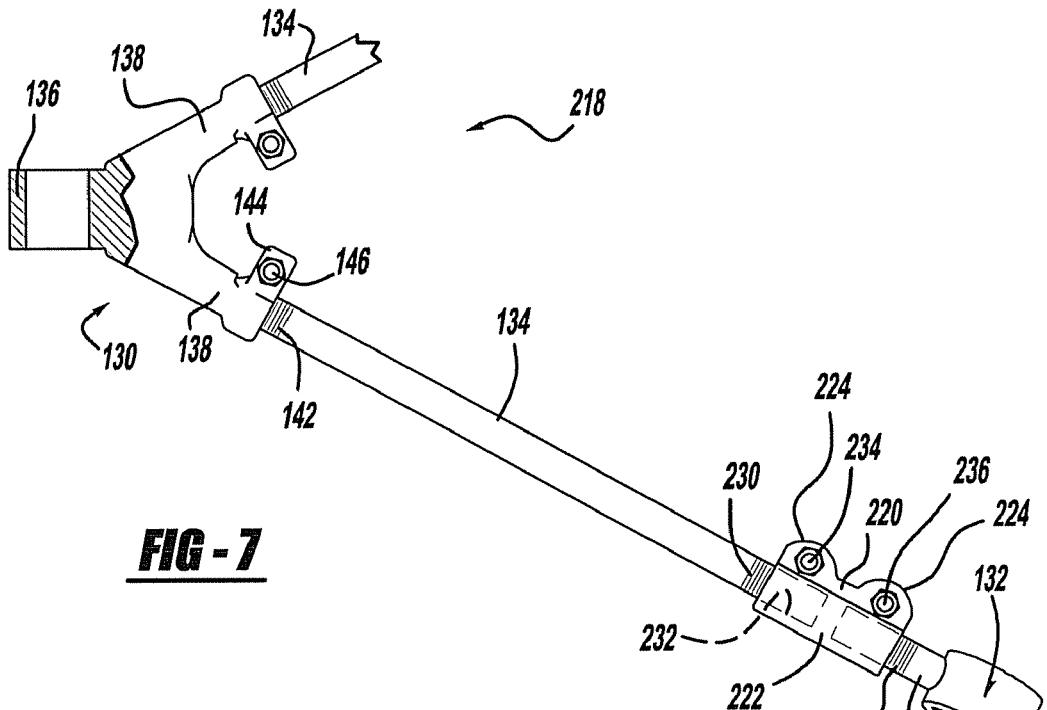
FIG. 7 is a plan view partially in cross section illustrating a V-type torque rod assembly in accordance with another embodiment of the present invention.

Referring now to FIG. 7, a V-shaped torque rod 218 in accordance with another embodiment of the present invention is illustrated. V-shaped torque rod 218 comprises cast apex pivotal joint assembly 130, the pair of end pivotal joint assemblies 132, the pair of solid bars 134 and a pair of attachment clamps 220. V-shaped torque rod 218 is essentially the same as V-shaped torque rod 118 with the exception that clamps 220 have been added to the end of solid bar 134 at a position adjacent end pivotal joint assemblies 132.

Clamp 220 comprises a tubular housing 222 having a pair of radially extending ears 224. An extension 226 of tubular eyelet 154 defines a threaded end 228. Threaded end 228 can be integral with tubular eyelet 154 or threaded end 228 can be welded to tubular eyelet 154 in a manner similar to that described above for enlarged section 150 of solid bar 134. The end of solid bar 134 defines a threaded end 230. Tubular housing 222 defines a threaded bore 232 into which threaded end 228 of extension 226 and threaded end 230 of solid bar 134 are assembled. Once the appropriate engagement length between threaded end 228 and bore 232, the appropriate engagement length between threaded end 230 and bore 232 and the appropriate length of V-shape torque rod 218 are set, a pair of bolts 234 are inserted through ears 224 and a pair of nuts 236 are threaded onto bolts 234. Nuts 236 are tightened to secure the attachment of clamp 220. A lock washer, a torque prevailing nut, a locking chemical or the like can be utilized to ensure the integrity of the connection between bolts 234 and nuts 236 if desired.

Figure 8:
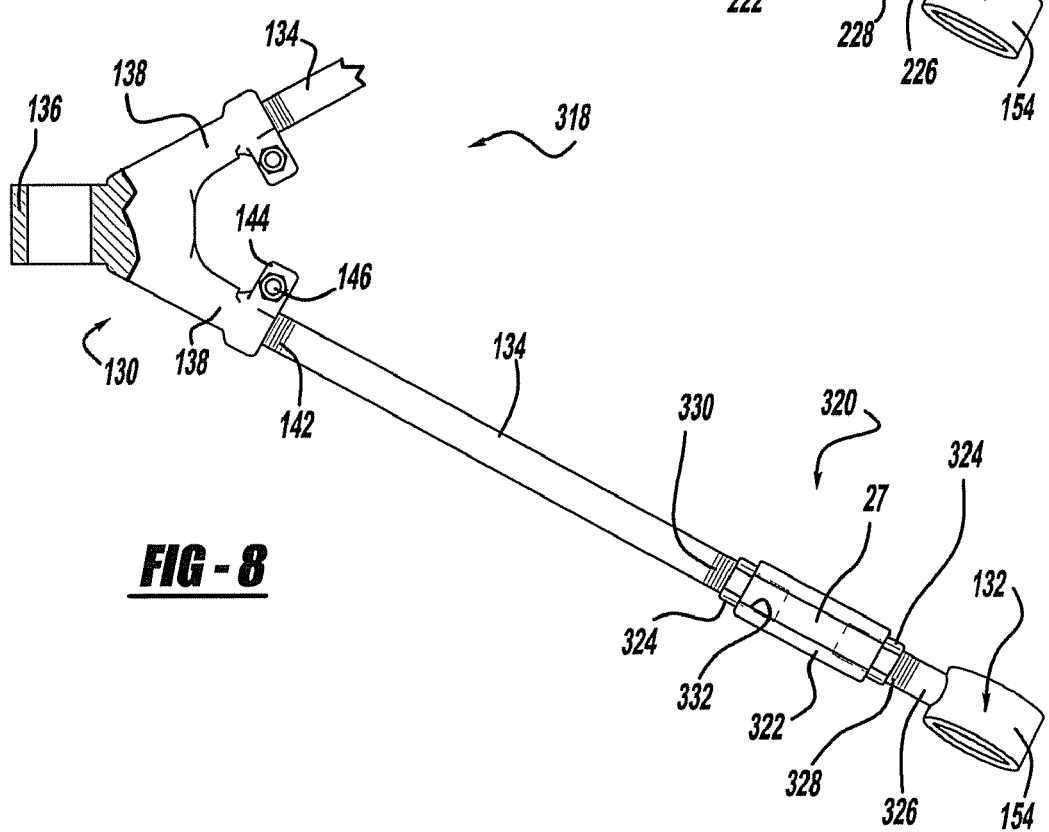
FIG. 8 is a plan view partially in cross section illustrating a V-type torque rod assembly in accordance with another embodiment of the present invention.

Referring now to FIG. 8, a V-shaped torque rod 318 in accordance with another embodiment of the present invention is illustrated. V-shaped torque rod 218 comprises cast apex pivotal joint assembly 130, the pair of end pivotal joint assemblies 132, the pair of solid bars 134 and an adjustment mechanism 320. V-shaped torque rod 318 is essentially the same as V-shaped torque rod 118 with the exception that adjustment mechanism 320 has been added to the end of solid bar 134 at a position adjacent end pivotal joint assemblies 132.

Adjustment mechanism 320 comprises a tubular housing 322 and a pair of nuts 324. An extension 326 of tubular eyelet 154 defines a threaded end 328. Threaded end 328 can be integral with tubular eyelet 154 or threaded end 328 can be welded to tubular eyelet 154 in a manner similar to that described above for enlarged section 150 of solid bar 134. The end of solid bar 134 defines a threaded end 330. Tubular housing 322 defines a threaded bore 332 into which threaded end 328 of extension 326 and threaded end 330 of solid bar 134 are assembled. One nut 324 is assembled onto threaded end 328 of extension 326 and one nut 324 is assembled onto threaded end 330 of solid bar 134 before they are assembled with tubular housing 322. Once the appropriate engagement length between threaded end 328 and bore 332, the appropriate engagement length between threaded end 330 and bore 332 and the appropriate length of V-shaped torque rod 218 are set, nuts 324 are moved towards tubular housing 322 and are tightened against tubular housing 322 to act as jamb nuts which retain the two threaded connections and thus the length of V-shaped torque rod 318.

Figure 9:
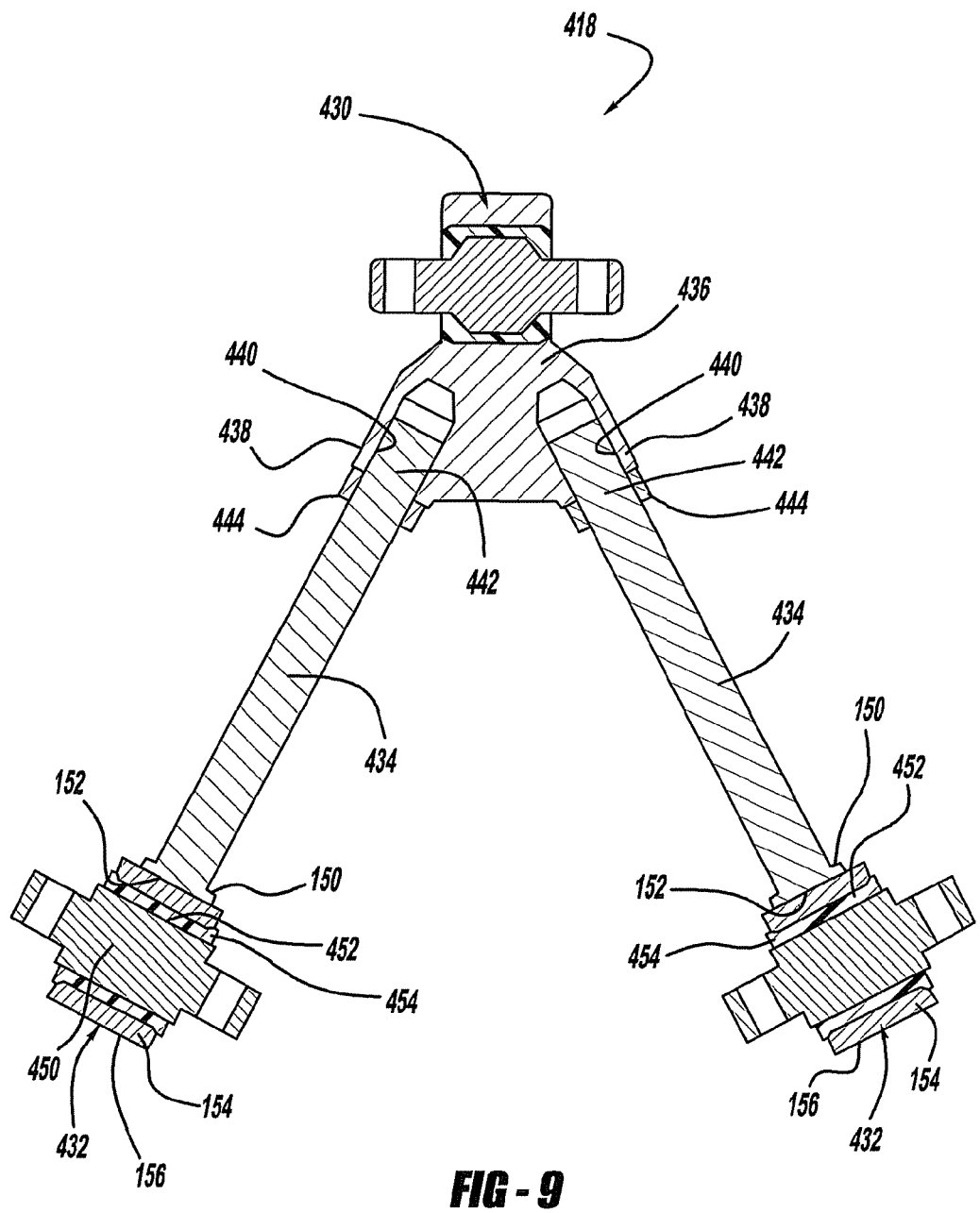
FIG. 9 is a plan view partially in cross section illustrating a V-type torque rod assembly in accordance with another embodiment of the present invention.

Referring now to FIG. 9, a V-shaped torque rod 418 in accordance with another embodiment of the present invention is illustrated. V-shaped torque rod 418 comprises a cast apex pivotal joint assembly 430, a pair of end pivotal joint assemblies 432 and a pair of solid bars 434. Each solid bar 434 extends between cast apex pivotal joint assembly 430 and a respective end pivotal joint assembly 432. End pivotal joint assemblies 432 are secured to solid bars 434 by welding or by other means known in the art. Cast apex pivotal joint assembly 430 is secured to solid bars 434 using a threaded connection as detailed below.

As shown in FIG. 9, cast apex pivotal joint assembly 430 is assembled into a V-shaped housing 436 which includes a pair of angular tubular rod extensions 438 which are angled at an angle which is specific to each vehicle application.

Each tubular rod extension 438 defines a threaded bore 440 which is designed to threadingly accept a threaded end 442 of solid bar 434. A jamb nut 444 is threaded onto each threaded end 442 of each solid bar 434 prior to assembling solid bar 434 with cast apex pivotal joint assembly 430. Once the proper length between cast apex pivotal joint assembly 430 and end pivotal joint assembly 432 is set, jamb nut 444 is tightened against tubular rod extension 438 of cast apex pivotal joint assembly 430 to prohibit any further length change.

Solid bar 434 is attached to end pivotal joint assembly 432 in the same manner described above for solid bar 134 and end pivotal joint assembly 132. Thus, solid bar 434 also defines enlarged section 150 and generally cylindrical surface 152. End pivotal joint assembly 432 includes generally tubular eyelet 154 which defines outer surface 156 which mates with cylindrical surface 152. Eyelet 154 is secured to enlarged section 150 by MIG welding or by other methods known well in the art. End pivotal joint assembly 432 comprises generally tubular eyelet 154, an inner metal 450 defining a cylindrical portion 452 and an elastomeric bushing 454 disposed between inner metal 450 and generally tubular eyelet 154. Cylindrical portion 452 permits rotational movement of inner metal 450 with respect to generally tubular eyelet 154. Any angular motion between inner metal 450 and generally tubular eyelet 154 is accommodated by the deflecting of elastomeric bushing 454.

Figure 10:
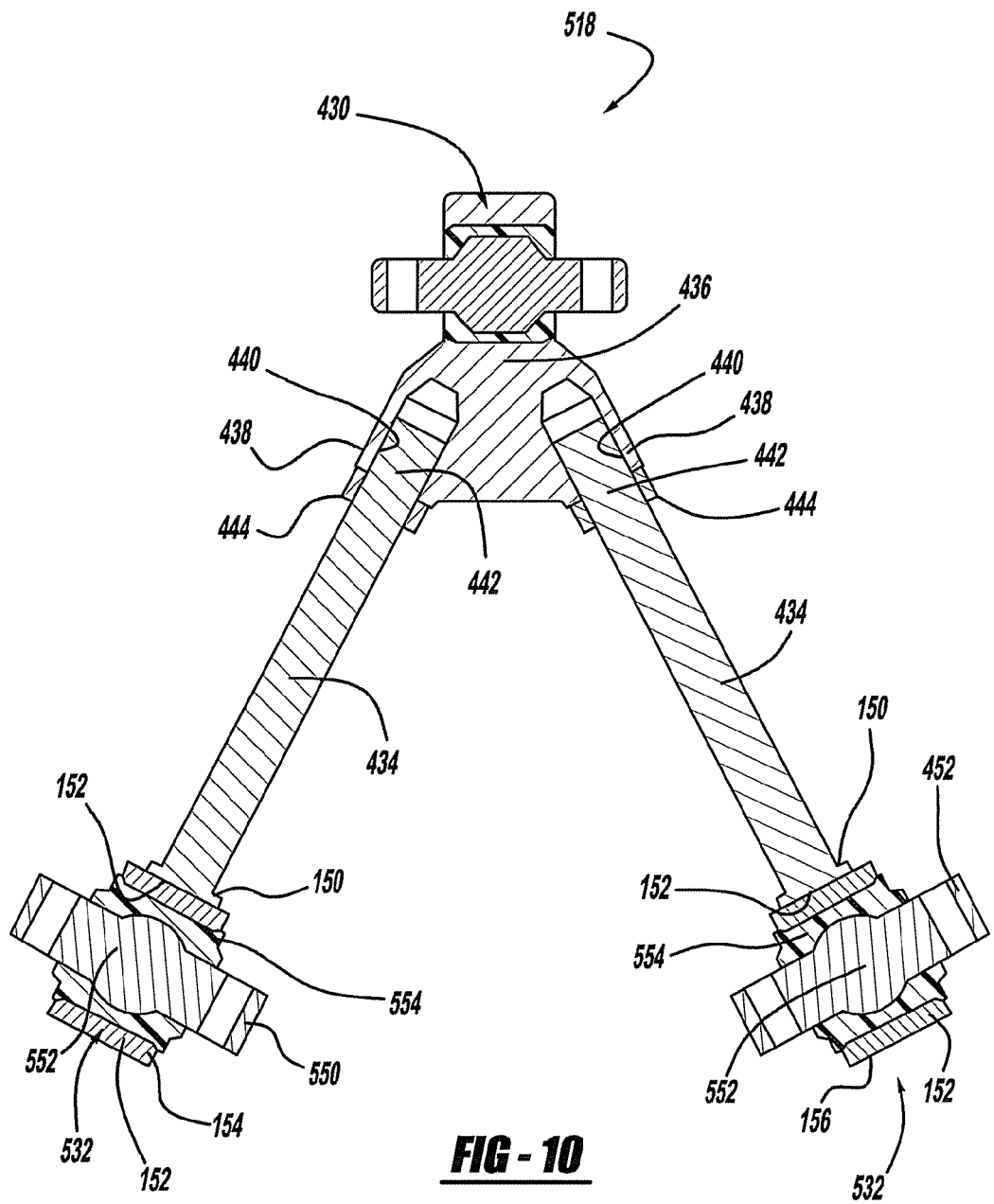
FIG. 10 is a plan view partially in cross section illustrating a V-type torque rod assembly in accordance with another embodiment of the present invention.

Referring now to FIG. 10, a V-shaped torque rod 518 in accordance with another embodiment of the present invention is illustrated. V-shaped torque rod 518 comprises cast apex pivotal joint assembly 430, a pair of end pivotal joint assemblies 532 and the pair of solid bars 434. Each solid bar 434 extends between cast apex pivotal joint assembly 430 and a respective end pivotal joint assembly 532. End pivotal joint assemblies 532 are secured to solid bars 434 by welding or by other means known in the art. Cast apex pivotal joint assembly 430 is secured to solid bars 434 using a threaded connection as detailed below.

As shown in FIG. 10, cast apex pivotal joint assembly 430 is assembled into V-shaped housing 436 which includes the pair of angular tubular rod extensions 438 which are angled at an angle which is specific to each vehicle application.

Each tubular rod extension 438 defines threaded bore 440 which is designed to threadingly accept threaded end 442 of solid bar 434. Jamb nut 444 is threaded onto each threaded end 442 of each solid bar 434 prior to assembling solid bar 434 with cast apex pivotal joint assembly 430. Once the proper length between cast apex pivotal joint assembly 430 and end pivotal joint assembly 532 is set, jamb nut 444 is tightened against tubular rod extension 438 of cast apex pivotal joint assembly 430 to prohibit any further length change.

Solid bar 434 is attached to end pivotal joint assembly 532 in the same manner described above for solid bar 134 and end pivotal joint assembly 132. Thus, solid bar 434 also defines enlarged section 150 and generally cylindrical surface 152. End pivotal joint assembly 532 includes generally tubular eyelet 154 which defines outer surface 156 which mates with cylindrical surface 152. Eyelet 154 is secured to enlarged section 150 by MIG welding or by other methods known well in the art. End pivotal joint assembly 532 comprises generally tubular eyelet 154, an inner metal 550 defining a ball 552 and an elastomeric bushing 554 disposed between inner metal 550 and generally tubular eyelet 154. Ball 552 permits both rotational as well as angular movement of inner metal 550 with respect to generally tubular eyelet 154.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A torque rod comprising:
    a first end joint assembly;
    a first solid rod secured to said first end joint assembly, said first solid rod defining a first threaded end;
    a second end joint assembly;
    a second solid rod secured to said second end joint assembly, said second solid rod defining a second threaded end; and
    an apex joint assembly comprising a monolithic single piece V-shaped housing defining a first and a second threaded bore, said first threaded end of said first solid rod directly engaging said first threaded bore, said second threaded end of said second solid rod directly engaging said second threaded bore.

2. The torque rod according to claim 1, further comprising a first clamp attached to said apex joint assembly, said first clamp prohibiting rotation of said first solid rod with respect to said apex joint assembly.

3. The torque rod according to claim 2, wherein said clamp is integral with said apex joint assembly.

4. The torque rod according to claim 2, further comprising a second clamp attached to said apex joint assembly, said second clamp prohibiting rotation of said second solid rod with respect to said apex joint assembly.

5. The torque rod according to claim 4, wherein said first and second clamps are integral with said apex joint assembly.

6. The torque rod according to claim 1, further comprising a length adjustment mechanism disposed between said first end joint assembly and said first solid rod.

7. The torque rod according to claim 6, wherein said length adjustment mechanism comprises a clamp secured to said first end joint assembly and to said first solid rod, said clamp prohibiting relative movement between said first end joint assembly and said first solid rod.

8. The torque rod according to claim 6 wherein said length adjustment mechanism comprises a threaded tubular housing and a pair of nuts, one of said pair of nuts threadingly engaging said first end joint assembly, the other of said pair of nuts threadingly engaging said first solid rod, said threaded tubular housing threadingly receiving said first end joint assembly and said first solid rod, said pair of nuts engaging said threaded tubular housing to prohibit relative movement between said first end joint assembly and said first solid rod.

9. The torque rod according to claim 1, further comprising:
    a first length adjustment mechanism disposed between said first end joint assembly and said first solid rod; and
    a second length adjustment mechanism disposed between said second end joint assembly and said second solid rod.

10. The torque rod according to claim 9, wherein:
said first length adjustment mechanism comprises a first clamp secured to said first end joint assembly and to said first solid rod, said first clamp prohibiting relative movement between said first end joint assembly and said first solid rod; and
said second length adjustment mechanism comprises a second clamp secured to said second end joint assembly and to said second solid rod, said second clamp prohibiting relative movement between said second end joint assembly and said second solid rod.

11. The torque rod according to claim 9, wherein:
said first adjustment mechanism comprises a first threaded tubular housing and a first pair of nuts, one of said first pair of nuts threadingly engaging said first end joint assembly, the other of said first pair of nuts threadingly engaging said first solid rod, said first threaded tubular housing threadingly receiving said first end joint assembly and said first solid rod, said first pair of nuts engaging said first threaded tubular housing to prohibit relative movement between said first end joint assembly and said first solid rod; and
said second adjustment mechanism comprises a second threaded tubular housing and a second pair of nuts, one of said second pair of nuts threadingly engaging said second end joint assembly, the other of said second pair of nuts threadingly engaging said second solid rod, said second threaded tubular housing threadingly receiving said second end joint assembly and said second solid rod, said second pair of nuts engaging said second threaded tubular housing to prohibit relative movement between said second end joint assembly and said second solid rod.

12. The torque rod according to claim 1, further comprising a jamb nut threadingly received by said first solid rod, said jamb nut engaging said apex joint assembly to prohibit relative movement between said first solid rod and said apex joint assembly.

13. The torque rod according to claim 1, further comprising:
a first jamb nut threadingly received by said first solid rod, said first jamb nut engaging said apex joint assembly to prohibit relative movement between said first solid rod and said apex joint assembly; and
a second jamb nut threadingly received by said second solid rod, said second jamb nut engaging said apex joint assembly to prohibit relative movement between said second solid rod and said apex joint assembly.

14. The torque rod according to claim 1, wherein said first end joint assembly comprises an inner metal defining a ball.

15. The torque rod according to claim 1, wherein said first end joint assembly comprises a first inner metal defining a first ball and said second end joint assembly comprises a second inner metal defining a second ball.

16. The torque rod according to claim 1, wherein said first end joint assembly comprises an inner metal defining a cylindrical surface.

17. The torque rod according to claim 1, wherein said first end joint assembly comprises a first inner metal defining a first cylindrical surface and said second end joint assembly comprises a second inner metal defining a second cylindrical surface.

* * * * *